United States Patent [19]

Hashimoto

[11] Patent Number: 5,606,753
[45] Date of Patent: Mar. 4, 1997

[54] FIXING DEVICE WITH A LOCKING MECHANISM

[75] Inventor: Toyoji Hashimoto, Saitama, Japan

[73] Assignee: Hashimoto Shinwa Setsubi, Limited, Saitama, Japan

[21] Appl. No.: 471,520

[22] Filed: Jun. 6, 1995

[30] Foreign Application Priority Data

Jun. 20, 1994 [JP] Japan .................................. 6-159692

[51] Int. Cl.⁶ ........................................................ F16B 7/82
[52] U.S. Cl. .............................. 411/7; 411/120; 411/191; 411/762; 411/778
[58] Field of Search .................................. 411/7, 82, 190, 411/120, 121, 149, 150, 258, 930, 191, 198, 962, 963, 977, 978, 114, 330, 326

[56] References Cited

U.S. PATENT DOCUMENTS

| | | |
|---|---|---|
| 324,347 | 8/1885 | Wynn ........................................ 411/977 |
| 687,774 | 12/1901 | Oliver ....................................... 411/326 |
| 831,806 | 9/1906 | Smith ....................................... 411/330 |
| 1,874,462 | 4/1930 | Crowther ................................... 411/82 |
| 3,425,314 | 8/1967 | Ohlson ........................................ 411/7 |
| 4,793,752 | 12/1988 | Frieberg . | |
| 4,812,094 | 3/1989 | Grube . | |
| 5,051,049 | 9/1991 | Wills ....................................... 411/258 |
| 5,180,265 | 1/1993 | Wiese ....................................... 411/326 |
| 5,190,423 | 3/1993 | Ewing . | |

FOREIGN PATENT DOCUMENTS

| | | |
|---|---|---|
| 57-202012 | 12/1982 | Japan . |
| 60-184419 | 12/1985 | Japan . |
| 2-121616 | 10/1990 | Japan . |

*Primary Examiner*—Steven N. Meyers
*Assistant Examiner*—Fredrick Conley
*Attorney, Agent, or Firm*—Armstrong, Westerman, Hattori, McLeland & Naughton

[57] ABSTRACT

A fixing device with a locking mechanism includes a bolt having a hexagonal head, a seat attached to the bottom face of the bolt head, and a washer to be fit onto the threaded shaft of the bolt. The seat has an engagement portion which is raised from an outer edge of the seat along a side face of the bolt head to restrain the free rotation of the bolt with respect to the seat, and an elastic engagement pawl outwardly extending from a lateral end of the engagement portion. The washer has a plurality of engagement grooves which are engagable with the engagement pawl, and an antislipping means provided on the side which contacts the surface of a member to be fastened. When the bolt is fastened, the engagement pawl engages with one of the engagement grooves of the washer. This prevents the hexagon-head bolt from turning in a loosening direction. A locking function can be added to the fixing device without additionally machining the bolt or a member to be fastened. The locking mechanism can be unlocked using a box wrench.

4 Claims, 4 Drawing Sheets

FIXING DEVICE WITH A LOCKING MECHANISM

BACKGROUND OF THE INVENTION

1. Field of the Invention

The present invention relates to a fixing device with a locking mechanism, and particularly to a fixing device with a disengagable locking mechanism capable of securely preventing a hexagon-head bolt or screw from loosening or coming off.

2. Description of the Related Art

Various types of locking mechanisms have been proposed and improved for a bolt with a hexagonal head wherein the bottom face of the hexagonal head of the bolt is frictionally engaged with a washer to prevent the bolt from loosening.

Examples of such locking mechanisms are as follows. Japanese Utility Model Publication (kokoku) No. 53-32199 discloses a locking mechanism in which a capsule containing an adhesive is placed inside a washer, and the capsule is broken as a bolt is fastened, so that a member to be fastened and the head of the bolt are bonded together by the adhesive flowing out of the capsule. Japanese Patent Publication (kokoku) No. 50-29102 discloses a locking mechanism in which a thick elastic ring is attached to a washer, and the elastic ring is crushingly pressed by the head of a bolt as the bolt is fastened, thereby increasing the rotational friction of the bolt. Japanese Patent Publication (kokoku) No. 43-25405 discloses a locking mechanism in which a rimmed locking washer is used to resist a reverse rotation of a bolt head. Japanese Utility Model Publication (kokoku) No. 4-7907 discloses a locking mechanism in which a projection formed on a washer is caused to engage with an annular groove formed in the bottom face of the head of a bolt, thereby preventing the bolt from loosening. These locking mechanisms, however, have problems that their actions for locking bolts are insecure, that repeated use is almost impossible, and that the bolts or nuts with which they are used require additional machining.

SUMMARY OF THE INVENTION

In view of the foregoing problems involved in conventional locking mechanisms, it is an object of the present invention to provide a fixing device with a locking mechanism which allows commercially available fixing devices to be used without additional machining, which can be used as attached to a bolt or nut, which has a simple structure, thereby decreasing production costs, which provides secure locking irrespective of the manner of fastening operation, which has a wide range of applications, and which can be used repeatedly as needed.

In order to attain the above objective, the present invention provides fixing devices with an improved locking mechanism.

According to a first aspect of the present invention, a fixing device with a locking mechanism comprises a bolt having a hexagonal head, a seat attached to the bottom face of the bolt head, and a washer to be fit onto the threaded shaft of the bolt. The seat has an engagement portion which is raised from an outer edge of the seat along a side face of the bolt head to restrain the free rotation of the bolt with respect to the seat, and an elastic engagement pawl outwardly extending from a lateral end of the engagement portion. The washer is provided with an annular rim which is raised from the peripheral edge of the washer to form a rimmed shape, and a plurality of axially extending engagement grooves which are formed in the inner surface of the annular rim for engagement with the engagement pawl, wherein the washer has an antislipping means on the side which contacts the surface of a member to be fastened.

When the bolt is fastened, the engagement pawl outwardly extending from the engagement portion elastically engages with one of the engagement grooves formed in the inner surface of the annular rim of the washer. This restrains, through the seat, the hexagon-head bolt from turning in a loosening direction.

According to a second aspect of the present invention, a fixing device with a locking mechanism comprises a bolt having a hexagonal head, a seat attached to the bottom face of the bolt head, and a washer to be fit onto the threaded shaft of the bolt. The seat has an engagement portion which is raised from an outer edge of the seat along a side face of the bolt head to restrain the free rotation of the bolt with respect to the seat, and an elastic engagement pawl outwardly extending from a lateral end of the engagement portion. The washer is provided with a plurality of radially extending engagement grooves which are formed in the peripheral edge of the upper surface of the washer for engagement with the engagement pawl, wherein the washer has an antislipping means on the side which contacts the surface of a member to be fastened.

When the bolt is fastened, the engagement pawl outwardly extending from the engagement portion elastically engages with one of the engagement grooves formed in the peripheral edge of the upper surface of the washer. This restrains, through the seat, the hexagon-head bolt from turning in a loosening direction.

In the fixing devices according to the first and second aspect of the present invention, it is preferred that the engagement portion or engagement pawl of the seat attached to the bolt head be partially extended to form an unlocking portion. When a box wrench is engaged with the bolt head, the unlocking portion engages with the edge of the opening of the box wrench so that the unlocking portion is deformed and the engagement pawl is disengaged from the engagement grooves of the washer, thus unlocking the fixing device.

The fixing devices according to the present invention are used as follows.

(1) A washer is placed on a member to be fastened at a predetermined position.

The washer has a roughened bottom face which is brought into close contact with the member to be fastened. Alternatively, an adhesive material or adhesive agent is inserted between the washer and the member. This prevents a slip between the washer and the member after they are fastened together by a fixing device.

In the case where the washer has a rimmed shape, the washer is placed on the member to be fastened such that the rimmed side of the washer faces outwardly with respect to the member.

(2) A fixing element such as a nut is placed on the back surface of the member to be fastened. The threaded shaft of the hexagon-head bolt is inserted into the center hole of the washer and a hole formed in the member to be fastened. The threaded shaft is then screwed into the threaded hole of the fixing element to fasten the member.

Before inserting the bolt into the washer, a seat is attached to the bottom face of the bolt head. As described above, the seat has an engagement portion, and an engagement pawl which outwardly extends from a lateral end of the engagement portion. The seat may have a plurality of engagement portions and engagement pawls.

(3) The engagement portion of the seat prevents relative rotation between the bolt and the seat. Also, the engagement pawl elastically engages with the engagement grooves which are formed in the inner surface of the annular rim of the rimmed washer, or formed at the peripheral edge of the upper surface of the washer.

Needless to say, as the fixing device is rotated in the fastening direction, the engagement pawl deforms against the elastic force so that the engagement pawl successively engages with and disengages from the engagement grooves of the washer while sliding across the surface of the grooves. This alternative engagement and disengagement continues until an appropriate fastening torque is given to the member to be fastened by the fixing device.

(4) The engagement pawl which elastically engages with a plurality of engagement grooves of the washer prevents the bolt head from rotating in a loosening direction opposite to the fastening direction through the engagement pawl and engagement portion of the seat. Accordingly, it is possible to eliminate the tendency in which the fixing device naturally loosens due to various causes.

Of course, the washer must not slip on the surface of the member to be fastened.

To prevent the slip, various means may be employed. However, the fact must be considered that as the fixing device is fastened, the washer itself is pressed against the surface of the member to be fastened to cause a close contact between the bottom face of the washer and the surface of the member to be fastened. This prevents relative slip between the washer and the member.

Under some conditions, it may be unnecessary to put an adhesive agent or the like between the washer and the member to be fastened.

However, adhesive agents are needed in the case where a secure locking is required.

Since the engagement pawl is formed by a bending process, it is difficult to accurately form the engagement pawl. Therefore, in the case where the seat has a plurality of engagement pawls, the phase or angular position of each engagement pawl has a slight variation. However, at any rotational angle at which a predetermined fastening torque can be applied to the fixing device, at least one engagement pawl may be engaged with an engagement groove of the washer. Accordingly, any reverse rotation (in the loosening direction) of the bolt is prevented by the engagement between the elastic engagement pawl and the engagement grooves.

Also, even when the engagement pawl is not engaged with the engagement grooves after fastening the bolt, their engagement will be immediately established after the bolt slightly rotates in the reverse direction.

Thus, it is possible to provide a locking action for each of fastening torques which are slightly different from each other.

(5) When a nut is used in combination with the fixing device, relative rotation between the nut and the member to be fastened must be prevented in addition to providing the locking between the fixing device and the member to be fastened. Otherwise, locking as a whole is not in effect. To prevent the nut from rotating, a washer is attached to the nut. The washer has a recess for receiving the nut and a bottom face which is treated for preventing a slip on the member to be fastened.

(6) When the fixing device of this type is desired to be unfastened, a box wrench having an opening is engaged with the hexagonal head such that the bolt head enters the opening. This causes the edge of the opening to press inward the unlocking portion of the elastic engagement pawl of the seat. Thus, the engagement pawl disengages from engagement grooves of the washer, thereby unlocking the locking mechanism. In the unlocked state, the fixing device is turned in the loosening direction to unfasten it.

While the bolt is being turned in the loosening direction, the elastic engagement pawl is maintained separated from engagement grooves of the washer.

(7) When an external force imposed on the elastic engagement pawl (unlocking portion) of the seat is removed, for example, when the box wrench is removed from the bolt head, the elastic engagement pawl returns to the original position where the engagement pawl engages with the engagement grooves of the washer. Accordingly, the state in item (3) above is established again.

Thus, the fixing device with a locking mechanism can be used repeatedly.

BRIEF DESCRIPTION OF THE DRAWINGS

The present invention is illustrated by the following drawings in which.

DESCRIPTION OF THE PREFERRED EMBODIMENTS

Embodiments of the present invention will now be described with reference to the drawings. In view of the fact that the design of components of the embodiments can be modified as needed using the techniques which are apparent to persons with ordinary skill in the art at the time of filing the basic application, the invention should not be construed to be limited to the details of the embodiments given herein.

Figure 1:
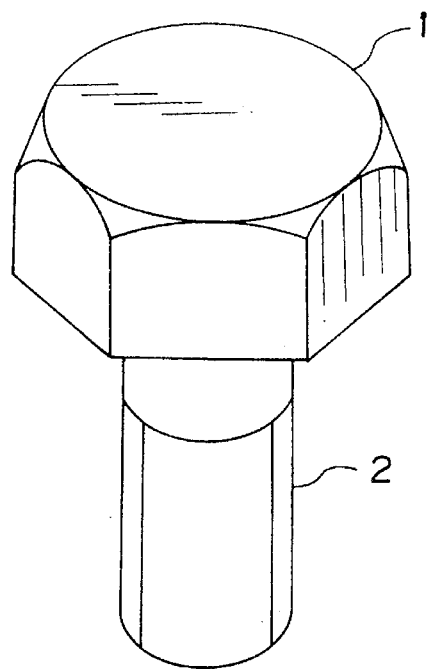
FIG. 1 is a perspective view of a hexagon-head bolt used in a fixing device with a locking mechanism according to a first embodiment of the present invention.
Figure 2:
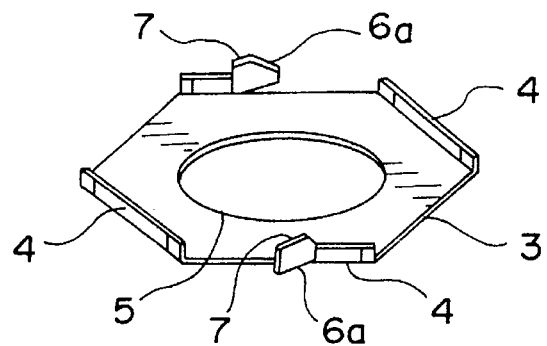
FIG. 2 is a perspective view of a seat used in the fixing device according to the first embodiment.
Figure 3:
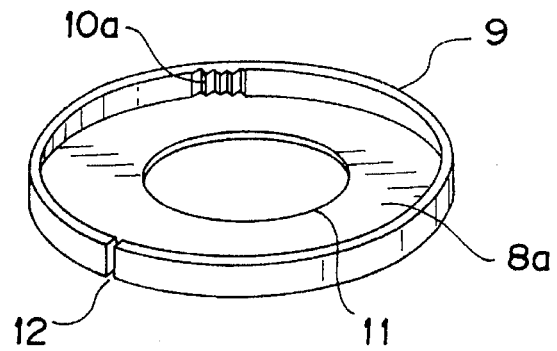
FIG. 3 is a perspective view of a washer used in the fixing device according to the first embodiment.

FIG. 1 is a perspective view of a hexagon-head bolt which is a main component of a fixing device with a locking mechanism according to a first embodiment of the present invention. FIG. 2 is a perspective view showing the detailed structure of a seat used in the fixing device. FIG. 3 is a perspective view showing a washer used in the fixing device.

In these drawings, reference numeral 1 denotes a hexagonal head of a hexagon-head bolt, and reference numeral 2 denotes a threaded shaft portion of the hexagon-head bolt. The hexagon-head bolt is an ordinary one which is commercially available and does not require additional machining. The length of the threaded shaft 2 depends on the thickness of a member to be fastened.

Reference numeral 3 denotes a seat which is attached to the bottom face of the bolt head 1 and which has substantially the same planar shape as the hexagonal head. An arbitrary number of engagement portions 4 are raised from edges of the seat to partially cover the side faces of the bolt head 1. Thus, the relative rotation between the bolt and the seat about the axis of rotation of the bolt is restrained, and the bolt and the seat are aligned to share a common central axis.

The alignment will be more facilitated by making the diameter of a center hole 5 of the seat 3 closer to that of the threaded shaft 2.

At least one engagement portion 4 is provided with an elastic engagement pawl 6a which laterally extends from the engagement portion 4 and is bent outwardly. The number of engagement pawls 6 depends on the number of engagement portions 4, but is preferably 2–4. Each elastic engagement pawl 6a is extended to a position that it elastically engages with axial engagement grooves of a washer, which will be described later.

Each of the engagement pawls 6a is formed at one lateral end of the engagement portion 4 and is oriented such that it only slides across axial engagement grooves of the washer, without engaging therewith, when the bolt is rotated in the fastening direction.

However, when the bolt rotates in the loosening direction, each of the engagement pawls 6a engages with an axial engagement groove of the washer to prevent the bolt from rotating further.

The bolt according to the present embodiment is of a right-handed bolt.

The upper portion of each engagement pawl 6a extends outwardly to form an unlocking portion 7. By pressing and deforming the unlocking portion 7 inward by any means, the engagement pawl 6a is also deflected inward to disengage from the axial engagement grooves.

Reference numeral 8a denotes a rimmed washer having a outer diameter slightly larger than that of the hexagonal head. Axially extending engagement grooves 10a are formed in the entire inner surface of an annular rim (raised edge) 9 which is provided along the circumferential edge thereof. The grooves are adapted to engage with the engagement pawls 6a.

The axial engagement grooves 10a preferably have a saw-tooth-like cross section of a fixed pitch. It was confirmed that a series of knurls, each having an apex angle of 60°, were equivalent in effect to the engagement grooves 10a.

The height of the annular rim (raised edge) 9 of the washer 8a is determined such that the annular rim 9 securely engages with the engagement pawl 6a but it does not interfere with a fixing tool.

A center hole 11 of the rimmed washer 8a has the substantially same diameter as the threaded shaft 2 of the bolt for easy alignment between the rimmed washer 8a and the threaded shaft 2.

In this connection, since the outer diameter of the hexagonal head 1 is substantially equal to the inner diameter of the annular rim (raised edges) 9 of the rimmed washer 8a, the alignment between the hexagonal head 1 and the annular rim 9 is spontaneously achieved when the hexagonal head 1 is fitted into the annular rim 9.

Reference numeral 12 denotes one or two drainage cuts formed in the annular rim 9. The cut 12 drains rain water or the like from the rimmed washer 8a, which rain water would otherwise rust the engagement pawls 6a and the annular rim 9 having the engagement grooves 10a.

A pressure-sensitive adhesive material is applied to the bottom face of the rimmed washer 8a.

Figure 4:
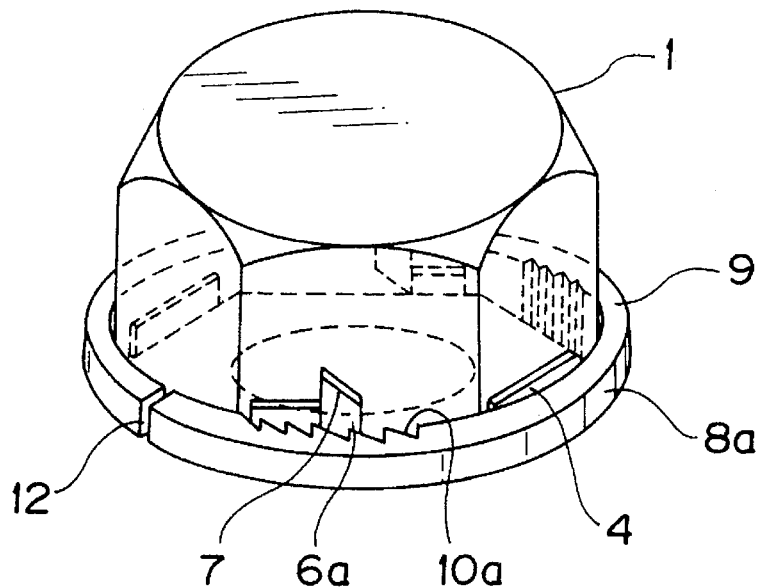
FIG. 4 is a perspective view of the fixing device according to the first embodiment which shows an assembled state.

FIG. 4 is a perspective view of the fixing device according to the present embodiment which shows an assembled state.

In FIG. 4, reference numeral 1 denotes the hexagonal head, 4 denotes the engagement portions extending from the seat, 6a denotes the engagement pawls extending from the engagement portions 4, 7 denotes the unlocking portions of the engagement pawls, 8a denotes the rimmed washer, 10a denotes the axial engagement grooves formed in the inner surface of the annular rim 9 of the rimmed washer 8a, and 12 denotes the drainage cut of the annular rim 9. As shown in FIG. 4, each elastic pawl 6a engages with one of the axial engagement grooves 10a having a saw-tooth like cross section.

The inner top edge of the annular rim 9 of the rimmed washer 8a is preferably chamfered so that the elastic engagement pawls 6a can be easy fitted into the rimmed washer 8a.

When the bolt head 1 is turned clockwise in FIG. 4, the elastic engagement pawls 6a deform and slide across the axial engagement grooves 10a. When the bolt head 1 is turned counterclockwise, i.e. when the bolt head 1 attempts to turn in the loosening direction, the engagement pawls 6a immediately engage with the axial engagement grooves 10a. Thus, the locking mechanism works.

When the unlocking portion 7 of each elastic engagement pawls 6a is pressed inward, the engagement pawl 6a deforms against the elastic force to disengage from the axial engagement grooves 10a.

If an elastic cap having an inner diameter substantially equal to the outer diameter of the annular rim 9 of the rimmed washer 8a is fitted to cover the hexagonal head 1 and the rimmed washer 8a, dust and water drop are prevented from adhering to the engagement claws 6a or the engagement grooves 10a or their neighboring areas. This prevents rusting. Accordingly, the locking mechanism has a prolonged service life.

Figure 5:
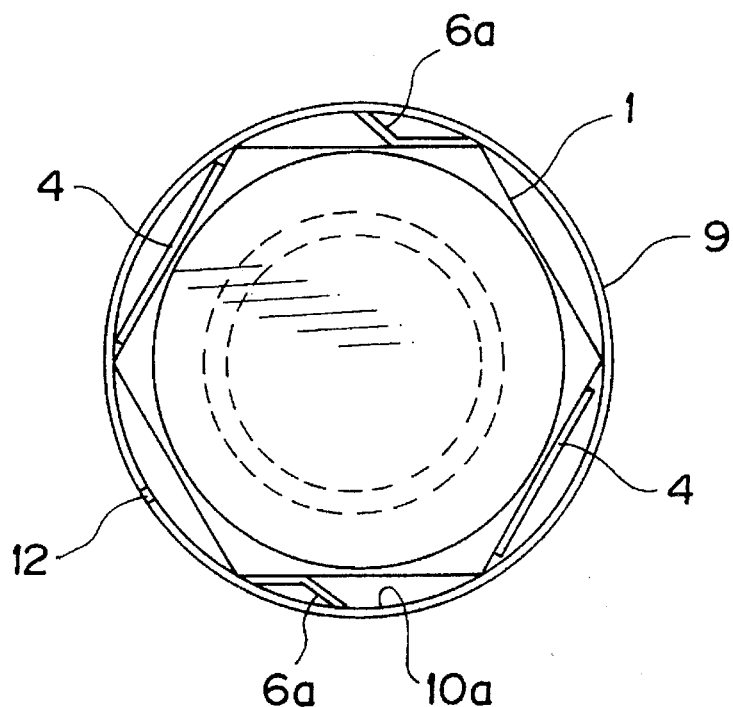
FIG. 5 is a plan view of the fixing device according to the first embodiment which shows an assembled state.

FIG. 5 is a top of the fixing device which shows an assembled state. As shown in FIG. 5, the hexagonal head 1 has a diameter slightly smaller than the inner diameter of the annular rim 9 of the rimmed washer 8a. The elastic engagement pawls 6a are located between the inner surface of the annular rim 9 of the rimmed washer 8a and the hexagonal head 1. The base portions of the engagement pawls 6a extend along the edge of the bolt head, and the free ends of the engagement pawls 6a engage with the axial engagement grooves 10a formed in the inner surface of the annular rim 9.

In the present embodiment, a pair of elastic engagement pawls 6a are symmetrically located.

Figure 6:
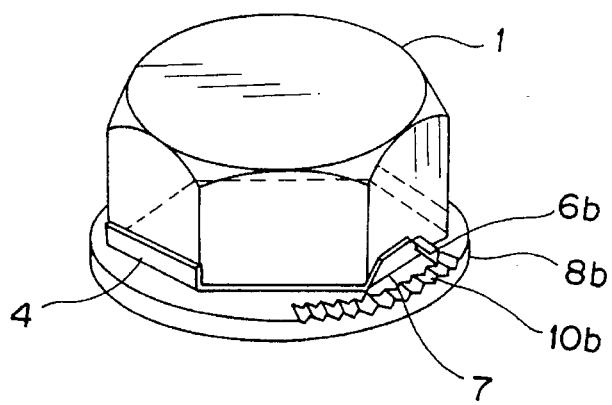
FIG. 6 is a perspective view of a fixing device with a locking mechanism according to a second embodiment of the present invention.

FIG. 6 is a perspective view of a fixing device with a locking mechanism according to a second embodiment of the present invention.

In FIG. 6, reference numeral 1 denotes a hexagonal head, 4 denotes engagement portions extending from a seat, 6b denotes elastic engagement pawls extending from the engagement portions 4, 7 denotes unlocking portions, 8b denotes a washer, and 10b denotes radially extending axial engagement grooves which are formed in the upper surface of the washer 8b along the circumference thereof and have a saw-tooth like cross section.

The diameter of the hexagonal head 1 is considerably smaller than the outer diameter of the washer 8b. The radial engagement grooves 10b are formed in an annular edge portion of the upper surface of the washer 8b between the circumferential edge of the hexagonal head 1 and the circumferential edge of the washer 8b.

Figures 7A, 8:
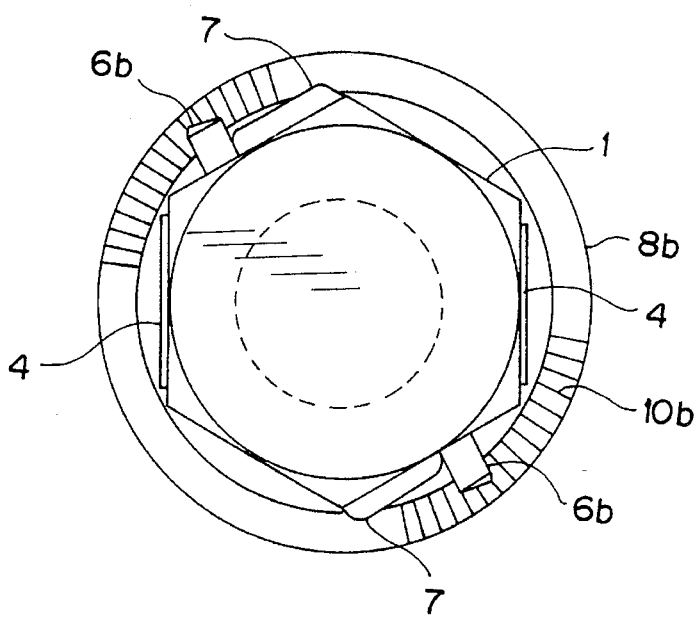
FIG. 8 is a plan view of the fixing device according to the second embodiment which shows an assembled state.

Although FIG. 6 shows only one elastic engagement pawl 6b extends from the seat and engages with one of the engagement grooves 10b formed in the upper surface of the washer 8b. However, as shown in FIG. 8, two engagement pawls 6b are actually provided for engagement with the engagement grooves 10b. Three or more engagement pawls may be provided for engagement with the engagement grooves 10b.

When the bolt head 1 is turned clockwise in FIG. 6, the elastic engagement pawls 6b deform and slide across the engagement grooves 10b. When the bolt head 1 is turned counterclockwise, i.e. when the bolt head 1 attempts to turn in the loosening direction, the engagement pawls 6b immediately engage with the engagement grooves 10b. Thus, the locking mechanism works as in the previous embodiment.

Figure 7:
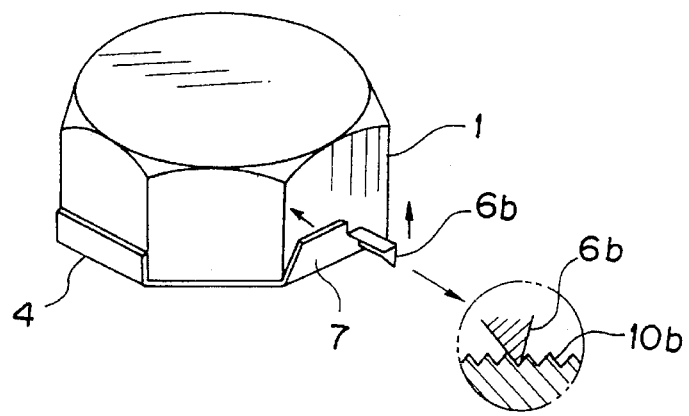
FIG. 7 is a perspective view showing a bolt head and a seat of the fixing device according to the second embodiment.

As is apparent from FIG. 7, when the unlocking portion 7 of each elastic engagement pawl 6b is pressed inward, the engagement pawl 6b deforms against the elastic force to disengage from the engagement grooves 10b.

FIG. 7 is a perspective view showing a combination of the bolt head 1 and the seat shown in FIG. 6. As shown in FIG. 7, the engagement portions 4 and the unlocking portions 7 extending from the seat, which is attached to the bottom face of the hexagonal head 1, partially enclose the side faces of the bolt head 1 to restrain the relative rotation therebetween.

The elastic engagement pawls 6b extending from the unlocking portions 7 are always engaged with the engagement grooves 10b provided along the circumferential edge of the washer, as illustrated by an enlarged view in a circle. The elastic engagement pawls 6b restrain the hexagonal head 1 from turning counterclockwise via the seat and the engagement portions 4. Thus, the locking mechanism works.

As shown in the view in the circle, each elastic engagement pawl 6b engages with one of the engagement grooves 10b at an angle of 45°–60°. This may be established by bending each elastic engagement pawl 6b.

When the unlocking portion 7 is pressed against an elastic force in the direction illustrated by an arrow, the elastic engagement pawl 6b disengages from the engagement grooves 10b. Thus, the locking mechanism becomes ineffective.

FIG. 8 is a plan view of the fixing device shown in FIG. 6. Reference numeral 1 denotes the hexagonal head, 8b denotes the washer, and 10b denotes the engagement grooves formed in the washer 8b along the circumference edge thereof.

Figure 9:
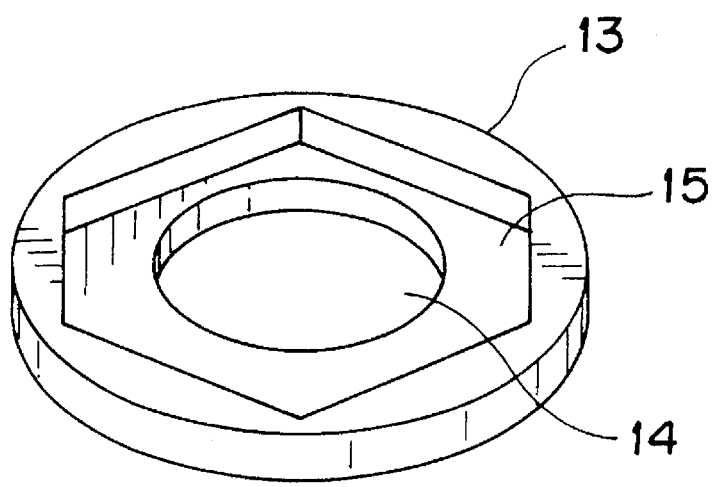
FIG. 9 is a perspective view of a washer which is used in combination with a nut of the fixing device according to the present invention.

FIG. 9 is a perspective view of a washer 13 which is used in combination with a nut. The washer 13 is relatively thick and has a center hole 14 and a hexagonal recess 15 for receiving the nut. In the present embodiment, the outer diameter of the washer is slightly larger than the diameter of the nut to make the circumferential edge thereof continuous. Also, a pressure-sensitive adhesive material or the like is applied to the other face of the washer which contacts a member to be fastened.

The washer 13 is normally used with a nut. However, when a bolt and a nut are used in pairs, the washer 13 may be used with the bolt.

Figure 10:
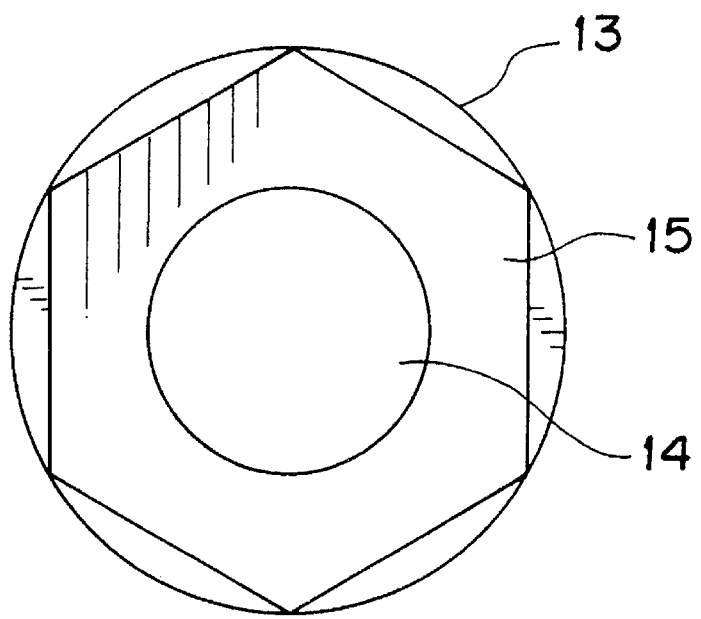
FIG. 10 is a plan view of the washer shown in FIG. 9.

FIG. 10 is a plan view of the washer 13. Reference numeral 15 denotes the hexagonal recess in the washer 13. One side of the hexagonal recess 15 and an opposed circumferential arc of the washer 13 form a crescent-like projection. The relative rotation between the nut and the washer 13 can be prevented only by providing a single pair of the projections located symmetrically with respect to the washer center. Also, this arrangement can prevent water from remaining in the hexagonal recess 15 of the washer 13 or freezing therein, prevent formation of rust due to air, and prevent dust from accumulating.

In the above-described present invention, when an hexagon-head bolt is screwed into a member to be fastened, through a washer placed on the member, an engagement pawl provided on a seat attached to the hexagonal head engages with an engagement groove formed in the washer. Therefore, the present invention provides the following effects:

(1) Once the hexagon-head bolt is screwed into the member to be fastened, the engagement pawl engaging an engagement groove of the washer restrains the bolt from turning in a loosening direction.

(2) If engagement grooves are provided in the washer at a smaller pitch or if the phase or angular position of each engagement pawl is slightly varied, a fastening torque of the hexagon-head bolt can be finely adjusted.

(3) A locking function can be provided without additionally machining a fixing device or a member to be fastened.

(4) When a bolt and a nut are used in pairs, a seat with engagement pawls and a washer with engagement grooves are used for one of them, and a plain washer may be used for the other of them.

(5) The locking mechanism can be unlocked using a box wrench. Therefore, the hexagon-head bolt screwed into the member to be fastened can be easily loosened. That is, a repeated use is possible.

(6) By attaching a protection cap to the locking mechanism, the mechanism can be protected from the environment.

(7) The fastening device can easily be attached. The locking performance does not depend on the skill of a worker.

Although the present invention has been described with respect to typical preferred embodiments thereof, it should be understood that the present invention is not limited to these embodiments, and various changes or modifications may be made without departing from the scope of the present invention as defined by the appended claims.

What is claimed is:

1. A fixing device with a locking mechanism, comprising:

a bolt having a hexagonal head, a seat attached to the bottom face of the bolt head, a washer to be fit onto a threaded shaft of said bolt, said seat having a generally planar central base portion and an engagement portion which is raised from an outer edge of said central base portion and fixedly located thereon so as to maintain a generally constant position along a peripheral side face of the bolt head to restrain the free rotation of said bolt with respect to said seat, an elastic engagement pawl extending outwardly from a lateral end of said engagement portion, said washer being provided with an annular rim which is raised from the peripheral edge of said washer to form a rimmed shape and a plurality of axially extending engagement grooves which are formed in an inner surface of the annular rim for engagement with said engagement pawl, said washer having an antislipping means on the side which contacts a surface of a member to be fastened, and said engagement pawl outwardly extending from said engagement portion elastically engaging with one of said engagement grooves formed in the inner surface of the annular rim of said washer when said bolt is fastened, thereby preventing said bolt from turning in a loosening direction.

2. A fixing device with a locking mechanism according to claim 1, wherein said engagement portion or said engagement pawl of said seat are partially extended to form an unlocking portion, said unlocking portion engaging with an edge of an opening of a box wrench when the box wrench is engaged with the bolt head so that said unlocking portion is deformed and said engagement pawl is disengaged from said engagement grooves of said washer, thus unlocking said fixing device.

3. A fixing device with a locking mechanism, comprising:

a bolt having a hexagonal head, a seat attached to the bottom face of the bolt head, a washer to be fit onto a threaded shaft of said bolt, said seat having a generally planar central base portion and an engagement portion which is raised from an outer edge of said central base portion and fixedly located thereon so as to maintain a generally constant position along a peripheral side face of the bolt head to restrain the free rotation of said bolt with respect to said seat, an elastic engagement pawl extending outwardly from a lateral end of said engagement portion, said washer being provided with a plurality of radially extending engagement grooves which are formed in the peripheral edge of an upper surface of said washer for engagement with said engagement pawl, and said washer having an antislipping means on the side which contacts a surface of a member to be fastened, and wherein said engagement pawl extending outwardly from said engagement portion elastically engages with one of said engagement grooves formed in the peripheral edge of the upper surface of said washer when said bolt is fastened, thereby preventing said bolt from turning in a loosening direction.

4. A fixing device with a locking mechanism according to claim 3, wherein said engagement portion or said engagement pawl of said seat are partially extended to form an unlocking portion, said unlocking portion engaging with an edge of an opening of a box wrench when the box wrench is engaged with the bolt head so that said unlocking portion is deformed and said engagement pawl is disengaged from said engagement grooves of said washer, thus unlocking said fixing device.

* * * * *